United States Patent [19]
Clack et al.

[11] Patent Number: 6,017,192
[45] Date of Patent: Jan. 25, 2000

[54] SYSTEM AND METHOD FOR CONTROLLING SCREW COMPRESSORS

[76] Inventors: Richard N. Clack, 5723 Willow Way, Buford, Ga. 30518; David Wallace Laird, 3337 David Rd., Chamblee, Ga. 30341

[21] Appl. No.: 08/959,369

[22] Filed: Oct. 28, 1997

Related U.S. Application Data

[60] Provisional application No. 60/029,402, Oct. 28, 1996.

[51] Int. Cl.[7] .................................................. F04B 49/02
[52] U.S. Cl. ................................ 417/18; 417/13; 417/53
[58] Field of Search ............................... 417/13, 18, 20, 417/22, 53, 32, 33

[56] References Cited

U.S. PATENT DOCUMENTS

| | | | |
|---|---|---|---|
| 4,227,862 | 10/1980 | Andrew et al. | 417/12 |
| 4,548,549 | 10/1985 | Murphy et al. | 417/53 |
| 4,950,964 | 8/1990 | Evans | 318/52 |
| 4,969,801 | 11/1990 | Haseley et al. | 417/18 |
| 5,209,076 | 5/1993 | Kauffman et al. | 62/126 |
| 5,219,041 | 6/1993 | Greve | 184/108 |
| 5,236,320 | 8/1993 | Oishi et al. | 418/84 |
| 5,350,992 | 9/1994 | Colter | 318/807 |
| 5,362,206 | 11/1994 | Westerman et al. | 417/12 |
| 5,365,904 | 11/1994 | Nofsinger et al. | 123/359 |
| 5,401,149 | 3/1995 | Tsuru et al. | 418/178 |
| 5,450,425 | 9/1995 | Gunn et al. | 340/825.16 |

*Primary Examiner*—Charles G. Freay
*Assistant Examiner*—Robert Z. Evora
*Attorney, Agent, or Firm*—Jones & Askew, LLP

[57] ABSTRACT

A compressor controller provides integrated monitoring, control, and alarm capabilities. The compressor controller receives a run signal from a rack controller. Upon receipt of the run signal, the compressor controller monitors startup conditions to determine whether it is safe to start the compressor. If so, the compressor controller applies power to the compressor and determines whether the compressor is running properly. Once the compressor is running properly, the compressor controller continues to monitor the operation of the compressor. If the compressor controller detects a fault conditions during the startup or operation of the compressor, the compressor controller provides an alarm signal and shuts down the compressor if necessary. The compressor controller provides maximum protection for the compressor by monitoring a plurality of relevant conditions and by shutting the compressor down when necessary. The compressor controller also maximizes the compressor's availability by evaluating the monitored conditions to determine whether the compressor can continue to run or be restarted despite a fault condition.

25 Claims, 5 Drawing Sheets

Fig_1

Fig_3

Fig-2

Fig. 4
STARTUP

Fig. 6 ALARM/SHUTDOWN

SYSTEM AND METHOD FOR CONTROLLING SCREW COMPRESSORS

STATEMENT REGARDING RELATED APPLICATIONS

This application claims the benefit of U.S. Provisional application Ser. No. 60/029,402, entitled "System and Method for Controlling Screw Compressors," filed Oct. 28, 1996.

TECHNICAL FIELD

The present invention relates to controllers for commercial refrigeration systems, and more particularly relates to a system and method for monitoring and controlling the startup and operation of screw compressors.

BACKGROUND OF THE INVENTION

Commercial refrigeration systems are used to maintain a cooled space or a refrigerated product at a desired temperature. Refrigerated cases or rooms are commonly used by grocery stores, restaurants, food distributors, and warehouses of various types. In order to maintain the quality of the refrigerated product while minimizing the cost of refrigeration, it is necessary to keep the temperature of the refrigerated product or case as close to the desired temperature as possible. If the temperature is allowed to rise, the quality or integrity of the product may be jeopardized. If the temperature is kept lower than necessary, energy is wasted and the already high cost of refrigerating the space is increased unnecessarily. For example, it is estimated that as much as two percent more energy is required for each degree the temperature runs below the desired temperature.

A refrigeration system provides a cooling effect by pumping a refrigerant through an evaporator, where the refrigerant changes from a liquid state to a gaseous state. One or more compressors are required to compress the gaseous refrigerant and return it to a liquid state before it passes through an expansion valve and through the evaporator. Because the compressors are the primary electromechanical element in the refrigeration system, they are the focus of most concerns regarding power consumption, cooling efficiency, wear and tear, and expense.

Commercial refrigeration systems are typically controlled by a rack controller. The rack controller is connected to temperature sensors or pressure sensors to determine whether the refrigerated space is too warm, too cool, or just right. Based on input from these sensors, the rack controller determines when one or more compressors should be turned on or off to adjust the cooling capacity of the system. Rack controllers start and stop a compressor by causing power to be applied to or removed from the compressor.

Commercial refrigeration systems typically employ either reciprocating compressors or screw compressors. Each type has its own advantages and disadvantages. For example, reciprocating compressors are available in lower horsepower ranges and are considerably less expensive on a per horsepower basis. However, reciprocating compressors cannot tolerate any liquid refrigerant and cannot overspeed to increase capacity and efficiency. Screw compressors, on the other hand, are smaller, more efficient, and require less maintenance than reciprocating compressors. They can also absorb as much as 40 per cent liquid refrigerant by volume. The primary disadvantage of screw compressors is that they cost approximately twice as much as a comparable size reciprocating compressor. As a result of their cost, those who use screw compressors have a significant incentive to ensure that the compressors are not damaged due to improper operating conditions.

Compressors can be protected from some types of damage by monitoring operating conditions and shutting down the compressor if conditions deviate from a safe operating range. For example, U.S. Pat. No. 5,209,076 describes a control system for preventing damage to a compressor in a refrigeration system. In the described system, a microprocessor monitors the refrigerant pressure, temperature, superheat, oil pressure, and motor current draw during the operation of a compressor and shuts it down automatically under certain conditions. It also provides a reset button to reset the compressor in the event a condition being monitored caused it to shut down.

Because screw compressors are more susceptible to damage resulting from improper operating conditions, it is advantageous to monitor a variety of parameters. Some prior art controllers have been designed to monitor oil flow, discharge temperature, and motor overload conditions while a screw compressor is operating. If one or more of these parameters deviate from a its predetermined operating range, an alarm will be triggered and the compressor will be shut off.

Because safe operation of a screw compressor can be affected by a variety of additional factors, it is advantageous to monitor additional parameters during startup, normal operation, and shut down of the compressor. In the prior art, however, monitoring additional parameters has required a variety of peripheral devices and has resulted in the monitoring and controlling equipment being larger, more complex, and more expensive. In addition, because separate devices are used to monitor different conditions, the processes associated with monitoring operating conditions, controlling the compressor in response to changing conditions, and providing notification or alarms are not well integrated.

It is desirable to fully integrate the monitoring, control, and alarm functions because this allows various situations to be handled in the most effective and efficient manner. For example, some conditions will require that an alarm be sounded and that the compressor be shut down until an operator remedies the failed condition and clears the alarm. In other situations, it may be safe to continue to operate a compressor while sounding an alarm in order to bring a condition to the attention of an operator. In yet another scenario, it may be appropriate to shut down the compressor, sound an alarm, and then attempt to restart the compressor after a predetermined amount of time has passed or after a condition has returned to an acceptable range.

Therefore, there is a need in the art for an improved system and method for monitoring and controlling refrigeration compressors. The improved system and method should provide an integrated facility for monitoring operating conditions, controlling the compressor, and providing notification of fault conditions. The system should monitor relevant conditions and respond to the monitored conditions by providing alarms and by controlling the compressor in a manner that provides maximum compressor availability while reducing the risk of damage to the compressor.

SUMMARY OF THE INVENTION

The present invention satisfies the above-described needs by providing an improved system and method for monitoring the operation of a compressor and for providing alarms and controlling the compressor in response to various operating parameters. This allows the monitoring, alarm, and control functions to be fully integrated in order to provide both protection for the compressor and maximum compressor availability when the compressor is needed by the refrigeration system. Protection is enhanced by monitoring a large number of relevant conditions. When a condition requires an alarm, compressor availability is enhanced by continuing to operate the compressor when it is safe to do so or by automatically restarting a compressor when a fault condition has returned to a safe operating range.

Generally described, the present invention provides a method for controlling a compressor in a refrigeration system that includes a compressor and a compressor controller. The method includes receiving a run signal and determining whether a first set of parameters, such as compressor temperatures, indicate the compressor may be started. If so, the compressor is started. The method then determines whether a second set of parameters, such as a rotation indicator, indicate that the compressor has started properly. If not, the compressor is shut down. If the compressor has started properly, a third set of parameters is examined to determine whether the compressor is operating properly. If it is not, the method executes an alarm/shutdown routine.

More particularly described, the present invention also includes the steps of losing the run signal from the rack controller and shutting down the compressor. The method then determines whether the compressor has continued to operate. If so, the method includes providing an alarm and maintaining oil flow to the compressor.

In another aspect, the present invention provides a compressor controller that includes an input for receiving a run signal from a rack controller, a plurality of inputs for receiving input signals indicative of operating parameters associated with a compressor, an output for applying power to the compressor, and a microprocessor. The microprocessor is operative to detect the run signal from the rack controller and to determine whether a first set of operating parameters indicates the compressor may be started. If so, the compressor is started and the microprocessor determines whether a second set of operating parameters indicates the compressor has started properly. If not, the compressor is shut down. Otherwise, the microprocessor determines whether a third set of parameters indicate the presence of a fault condition. If a fault condition is present, the microprocessor determines whether the fault condition requires an alarm and whether the fault condition requires the compressor to be shutdown. If the compressor is shut down, the microprocessor determines whether the compressor may be restarted.

The various aspects of the present invention may be more clearly understood and appreciated from a review of the following detailed description of the disclosed embodiments and by reference to the appended drawings and claims.

DETAILED DESCRIPTION

The present invention is directed to an improved system and method for monitoring the operation of a compressor and for providing alarms and controlling the compressor in response to various operating parameters. In an exemplary embodiment, the invention provides an integrated compressor controller that monitors relevant conditions, provides alarm signals, and controls the compressor in response to the monitored conditions. The compressor controller provides maximum protection for the compressor by monitoring a plurality of relevant conditions and by shutting the compressor down when necessary. The compressor controller also maximizes the compressor's availability by evaluating the monitored conditions to determine whether the compressor can continue to run or be restarted despite a fault condition.

Referring now to the drawings, in which like numerals represent like elements throughout the several figures, aspects of the present invention and an exemplary refrigeration system will be described.

Figure 1:
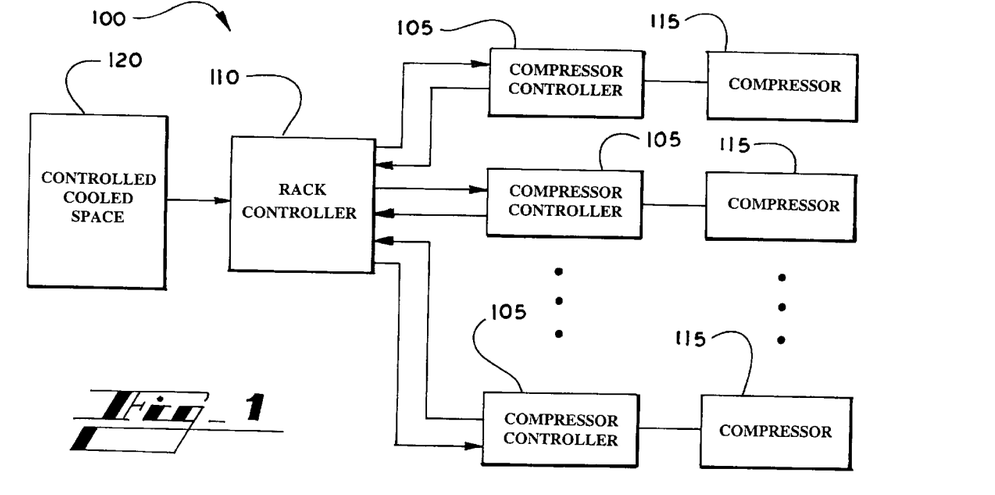
FIG. 1 is a block diagram illustrating a refrigeration system that includes a compressor controller in accordance with the present invention.

FIG. 1 is a block diagram illustrating a refrigeration system 100 that includes a plurality of compressors 115 and compressor controllers 105, which operate in accordance with the present invention. In an exemplary refrigeration system, a compressor controller 105 is connected between a rack controller 110 and each screw compressor 115. The refrigeration system is designed to keep a refrigerated space 120 at a predetermined temperature. The rack controller 110 monitors pressures associated with the refrigeration system or temperatures associated with the refrigerated space 120 and attempts to maintain a desired temperature by turning one or more compressors 115 on or off as needed. Each compressor controller 105 receives a run signal from the rack controller 110 and is connected to a variety of sensors associated with its compressor 115. Before applying a run signal to the compressor 115, the compressor controller 105 ensures that certain monitored conditions are within acceptable limits. After the run signal is applied to the compressor 115, the compressor controller 105 monitors various conditions to ensure that the compressor 115 is running properly. When an improper condition is detected, the compressor controller 105 will notify the rack controller 110 and will shut down the compressor 115 if necessary. If a compressor 115 is shut down, the associated compressor controller 105 will determine whether the condition requires the compressor 105 to remain shut down or whether it may be restarted. In cases where the compressor 115 may be restarted automatically, the compressor controller 105 will typically impose a predetermined delay or verify that a fault condition has returned to an acceptable range prior to restarting the compressor 115.

Figure 2:
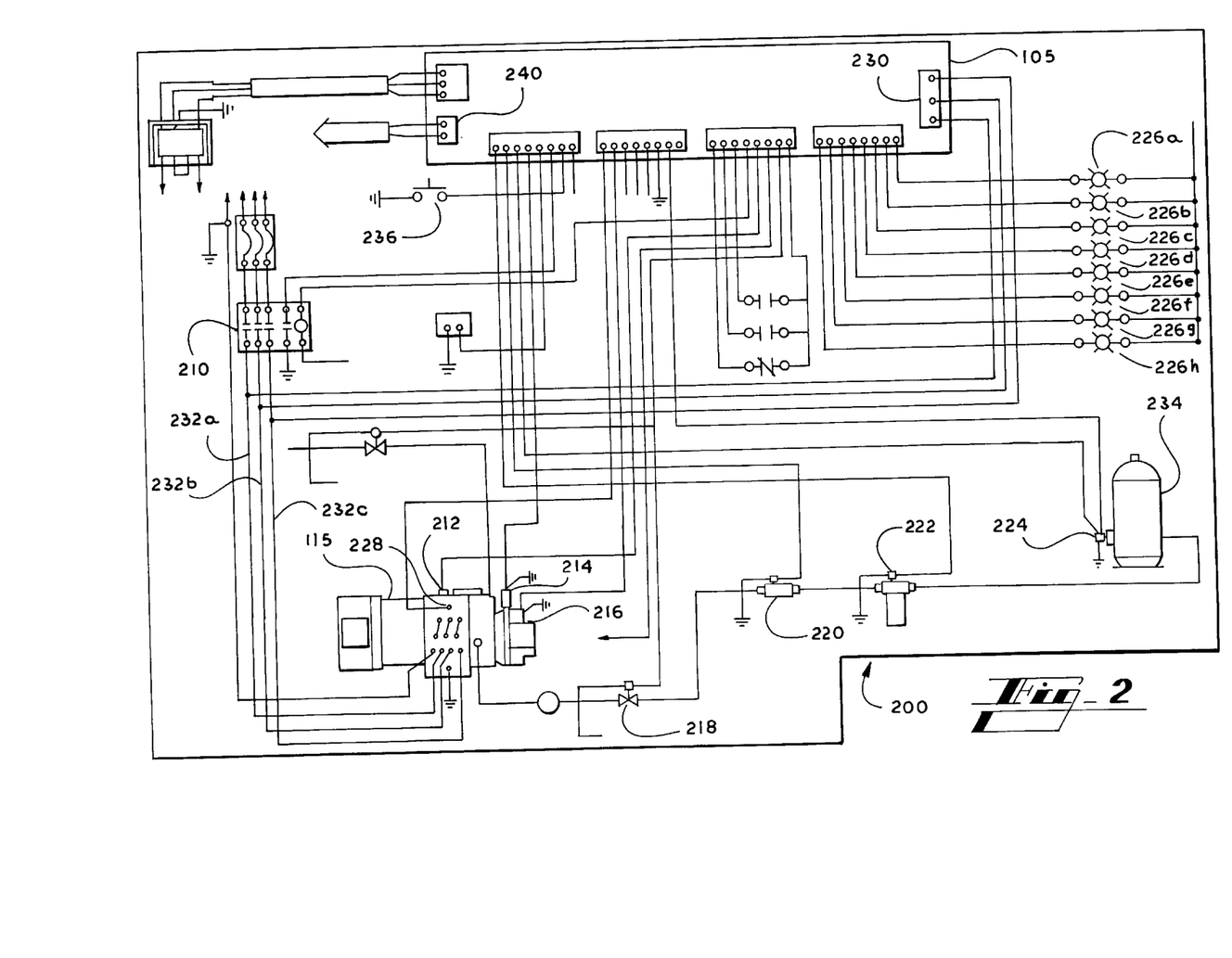
FIG. 2 is schematic diagram of a refrigeration system that includes the compressor controller of FIG. 1, a screw compressor, and various measuring devices.

FIG. 2 is a schematic diagram of a refrigeration system 200 that includes the compressor controller 105, a screw compressor 115, and various measuring devices. In an exemplary embodiment, the invention is embodied in a model ESC 200 compressor controller, which is sold by Delta Heat Transfer, Inc. of Flowery Branch, Ga. The exemplary compressor controller is ideally suited for operation with the series of open (Type OS) and semi-hermetic (Type HS) screw compressors manufactured by Bitzer Kuhlmaschinenbau GmbH & Co. KG, Sindelfingen, Germany. The compressor controller 105 monitors inputs that indicate the status of the compressor and the refrigeration system and provides outputs to control the screw compressor 115 and other equipment in the refrigeration system 200. The compressor controller 105 also receives a compressor run signal from the rack controller 110 and is able to notify the rack controller 110 of fault conditions it has detected.

The compressor controller 105 provides output signals to the compressor loader solenoid 212, the compressor contactor 210, the oil solenoid valve 218, and alarm lamps 226a–h.

The compressor loaders are used to vary the capacity of the screw compressor in fixed steps to a minimum capacity of 50%. The loaders also act as a "soft start", which allows the compressor to start with a minimum load reducing the required power and saving energy. When deenergized, the compressor loader solenoid 212 prevents power from reaching the loaders, which removes the load from the compressor. When the compressor controller 105 sends an output signal to activate the compressor loader solenoid 212, the compressor loader solenoid 212 activates to allow power to enter the loaders.

The compressor controller applies power to the screw compressor 115 by means of the compressor contactor 210. The compressor contactor 210 contains a set of contacts, which when closed, provide three phase power to the screw compressor 115. The compressor controller 105 controls a signal that causes the compressor contactor 210 to close the contacts, thereby applying power to the screw compressor 115. Upon receiving a signal to open the contacts in the compressor contactor 210, the compressor contactor responds by opening the contacts and thereby cutting power to the screw compressor 115.

The oil solenoid valve 218 controls the flow of oil that enters the screw compressor 115. The compressor controller 105 signals the oil solenoid valve 218 to either open or close the valve. The oil solenoid valve 218 responds to the open signal by opening the valve, allowing oil to flow to the screw compressor 115. The oil solenoid responds to the close signal by closing off the oil flow to the screw compressor 115.

The compressor controller 105 is also connected to alarm lamps 226a–h. When the compressor controller 105 detects a fault condition, the compressor controller 105 provides a signal that illuminates the alarm lamp that corresponds to the fault condition to light up.

As mentioned above, the compressor controller receives a variety of input signals that indicate the condition of the screw compressor 115 and the refrigeration system. These input signals include a motor overload temperature signal, a discharge gas temperature signal, a compressor rotation signal, an oil flow signal, an oil level signal, a run proof signal, a dirty oil filter signal, and the three phase power. The compressor controller also receives input signals for a remote reset and from a manual reset switch.

The motor overload temperature signal is generated by a thermistor 228 that indicates the temperature of the screw compressor motor's windings. The signal indicates when the screw compressor motor temperature exceeds a predefined safe limit. A signal will be received by the compressor controller 105 indicating the motor temperature in the screw compressor 115 exceeds a predefined safe limit. In the event the windings overheat due to voltage or amperage limits out of the safe operating range or any malfunction that causes a high motor temperature, the motor overload temperature signal will be received by the compressor controller 105 causing it to register a motor temperature overload fault.

The discharge gas temperature signal is generated by a discharge gas thermistor 216, which senses the discharge gas temperature in the discharge cavity of the screw compressor 115. When a safe operating discharge gas temperature is exceeded, the discharge gas thermistor 216 signals the compressor controller 105 causing it to register a discharge gas thermistor fault.

The screw compressor rotation signal is provided by a rotation switch 214 that is located in the discharge area of the screw compressor 115 before the internal check valve. The rotation switch 214 closes when subject to a pressure greater than 30 psi and opens when pressure is less than 20 psi. When the screw compressor is operating in the proper direction, the pressure will exceed 30 psi and the screw compressor rotation signal will indicate proper rotation. However, if the screw compressor 115 is operating in the reverse direction, the screw compressor's Vi pressure area will be in a vacuum, leaving the rotation switch open and consequently, the compressor controller 115 receives an improper rotation signal.

The oil flow signal is provided by an oil flow switch 220, which closes when the minimum required oil flow is present. The oil flow switch 220 is a normally open switch measuring both minimum oil flow and differential pressure of the oil flowing to the screw compressor 115. When the minimum required flow of oil is present, the oil flow switch 220 closes and a signal is received by the compressor controller 105 indicating that the minimum required flow of oil is present. When the minimum required flow of oil is not present, the oil flow switch 220 opens and a signal is received by the compressor controller 105 signifying that the oil flow is too low.

The oil level signal is generated by an oil level sensor switch 224, which detects the level of oil in the oil separator 234. Under normal operating conditions, the oil level sensor switch is closed and the compressor controller 105 receives a return signal indicating that the oil level is above the minimum required in the oil separator 234. When the oil level falls to an unsafe level, the oil level sensor switch 224 closes and a signal is received by the compressor controller 105 signifying that the oil level is below the minimum required.

A run proof signal is provided by the compressor contactor 210 and indicates whether the contacts in the contactor are open or closed. When the contacts in the contactor 210 are closed, the run proof input signal indicates to the compressor controller 105 that they are closed and power is being applied to the screw compressor 115. When the contacts are open, the run proof input signal indicates that they are open and that no power is being applied to the screw compressor 115.

The three power phases 232a–c also provide an input to the compressor controller 105. The compressor controller 105 will monitor these phases and check for phase loss and phase sequence. Phase sequence monitoring is one method the compressor controller 115 uses to monitor the rotation of the screw compressor 115, the other method is the rotation switch 214 discussed above. If there is a phase loss or the phase sequence indicates that the rotation is in the wrong direction, the compressor controller 105 will register a power phase fault.

The oil filter signal is provided by an oil filter differential switch 222, which measures the differential pressure across the oil filter. The oil filter differential switch 222 is typically configured in a normally closed contact configuration. When the pressure differential across the oil filter is above a predefined limit, the oil filter differential switch 222 signals the compressor controller 105 through the oil filter input that the oil filter is dirty.

The compressor controller 105 also provides an input for a manual reset switch and a remote alarm reset. When the compressor controller 105 receives a signal for a reset from the manual reset switch (not shown), the compressor controller 105 clears any fault condition detected. When the compressor controller 105 receives a reset signal from the remote alarm reset input 236, the compressor controller 105 clears any fault condition detected except for a compressor rotation fault.

The compressor controller 105 also provides a network interface 240 that can be used to communicate with the rack controller via an Echelon network or an RS-485 bus network. The network interface 240 can be used to allow direct access to the different functions of the compressor controller for alarming, accessing alarm logs, reading output information of data generating devices, and controlling operation functions. This network interface can also be used by other electronic controllers for direct communication with the compressor controller 105. The Echelon network, developed by Lon Works of England, is a communication protocol that will allow various devices from different manufacturers to communicate back to a common communication point for monitoring and operational control.

Figure 3:
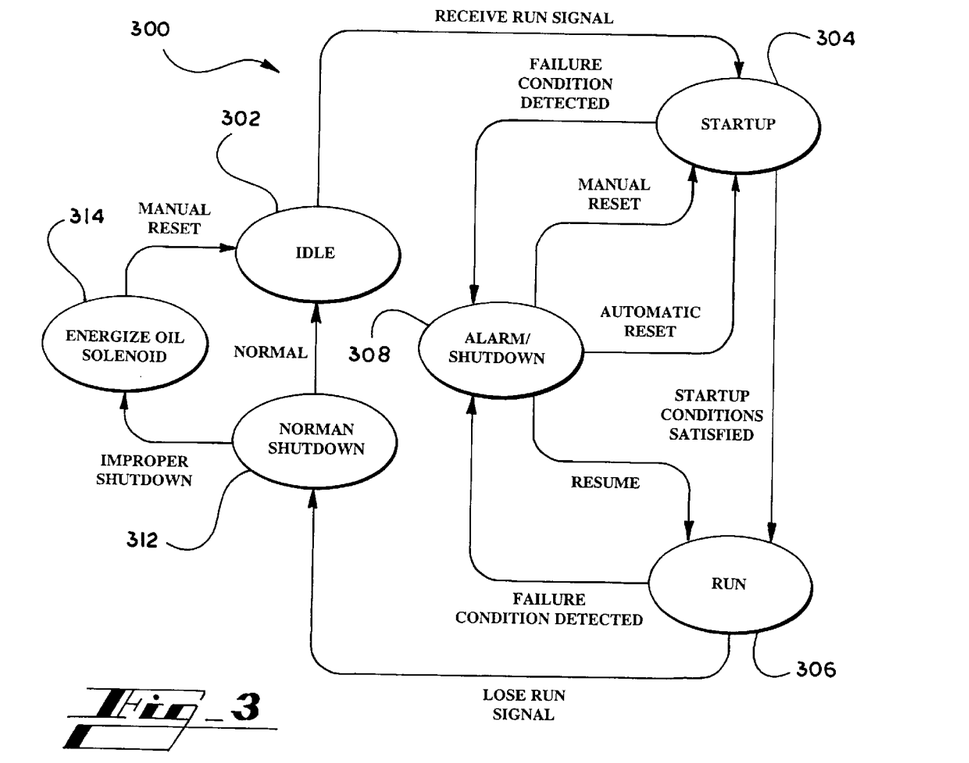
FIG. 3 is a state diagram illustrating an exemplary method for controlling a compressor using the compressor controller of FIG. 2.

FIG. 3 is a state diagram illustrating an exemplary method 300 for controlling a screw compressor using a compressor controller 105 (FIG. 1) in accordance with the present invention. The state diagram illustrates the processes that are used to control a compressor 115 (FIG. 1) during various phases of its operation. In general, the operation of the compressor controller is divided into several phases, including a startup phase, a run phase, an alarm/shutdown phase, and a normal shutdown phase. Each of these phases is discussed below.

The method 300 begins at the idle state 302, which occurs when the signal from the rack controller 110 (FIG. 1) indicates that the compressor should not be running. This will be the case when the compressor is not needed to maintain the refrigerated space at its proper temperature.

The method 300 transitions to a startup state 304 when the compressor controller receives a run signal from the rack controller. This occurs when the rack controller determines that the compressor is needed to keep the refrigerated space at the proper temperature. In the startup state 304, the compressor controller performs a static check before applying power to the compressor and a dynamic check immediately after power is applied. During the static check, the compressor controller ensures that it is safe to start up the compressor before applying power to the compressor. This is accomplished by checking various temperatures and other conditions that might indicate the compressor should not be started. If the compressor controller determines that it is safe to start the compressor, it applies power to the compressor and immediately begins to check conditions that would confirm that the compressor has started up and is operating properly. If the compressor is started successfully, the compressor controller enters the run state 306. If the compressor controller detects a problem during the startup state, the compressor controller enters the alarm/shutdown state 308. The startup state 304 is discussed in more detail in conjunction with the flow chart of FIG. 4.

In the run state 306, the compressor controller monitors a variety of conditions that indicate whether it is safe to continue to operate the compressor. These conditions include various temperatures, oil flow, and the like. If one of the monitored conditions is found to be outside of its predetermined operating range, the compressor controller enters the alarm/shutdown state 308. If the rack controller removes the run signal, which indicates that the compressor is no longer needed, the compressor controller enters the normal shutdown state 312. The run state 306 is discussed in more detail in conjunction with the flow chart of FIG. 5.

In the alarm/shutdown state 308, the compressor controller determines how to respond to the fault that was detected in the startup state 304 or the run state 306. In most cases, the compressor controller will respond to a fault in one of three ways. If the fault is not serious, the compressor controller can signal an alarm to the rack controller while allowing the compressor to continue to operate. This corresponds to following the resume event back to the run state 306. If the fault is serious, the compressor controller can signal an alarm to the rack controller and shutdown the compressor until the controller is manually reset by an operator. Once the manual reset signal is received, the compressor controller can return to the startup state 304. In the case of some faults, the compressor controller may determine that it can attempt to restart the compressor. In most cases, the compressor would not be restarted until the compressor controller imposes a predetermined delay or determines that the fault condition has returned to an acceptable operating range. In this case, the compressor controller returns to the startup state 304. The alarm/shutdown state 308 is discussed in more detail in conjunction with the flow chart of FIG. 6.

In the normal shutdown state 312, the compressor controller removes power from the compressor and then checks to make sure that the compressor has stopped. If so, the compressor controller returns to the idle state 302. If the compressor is still running due to a failed contactor or other problems, the compressor controller goes to state 312 where it signals and alarm and takes steps to ensure that the compressor continues to operate safely. For example, the compressor controller will reenergize the oil flow solenoid to ensure that the compressor is properly lubricated as it continues to operate. The compressor controller will return to the idle state 302 when the compressor is manually shutdown and the alarm is reset by the operator.

In summary, the method 300 illustrates the ability of the compressor controller to provide integrated monitoring, control, and alarm functionality. This allows the controller to monitor relevant system conditions and take appropriate steps to protect the compressor. By being able to automatically restart the compressor or allowing the compressor to continue to operate, the compressor controller ensures that the compressor will be available to provide cooling when the rack controller decides that the compressor is needed.

Figure 4:
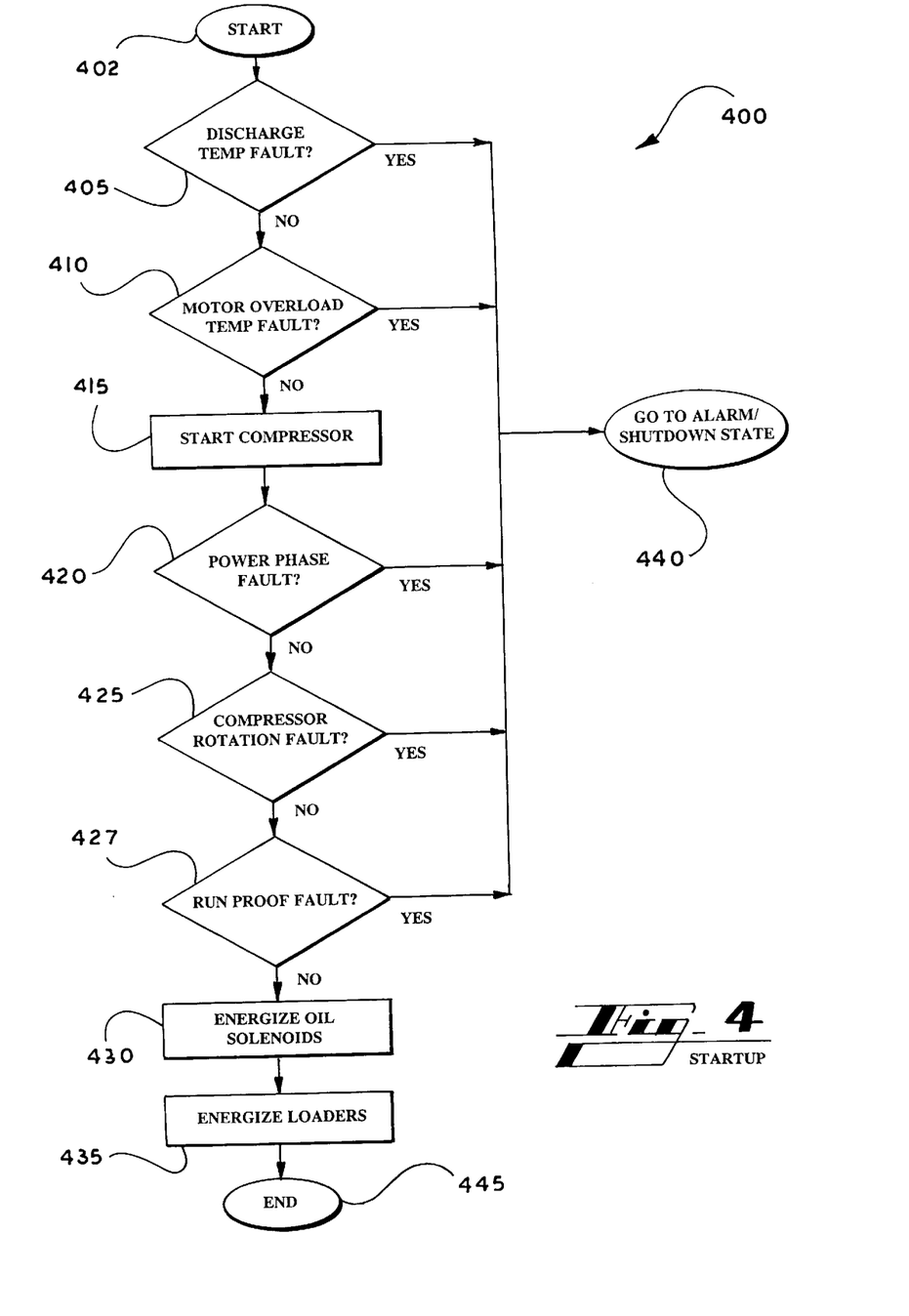
FIG. 4 is a flow diagram illustrating an exemplary method for starting up a compressor and which forms a part of the method of FIG. 3.
Figure 5:
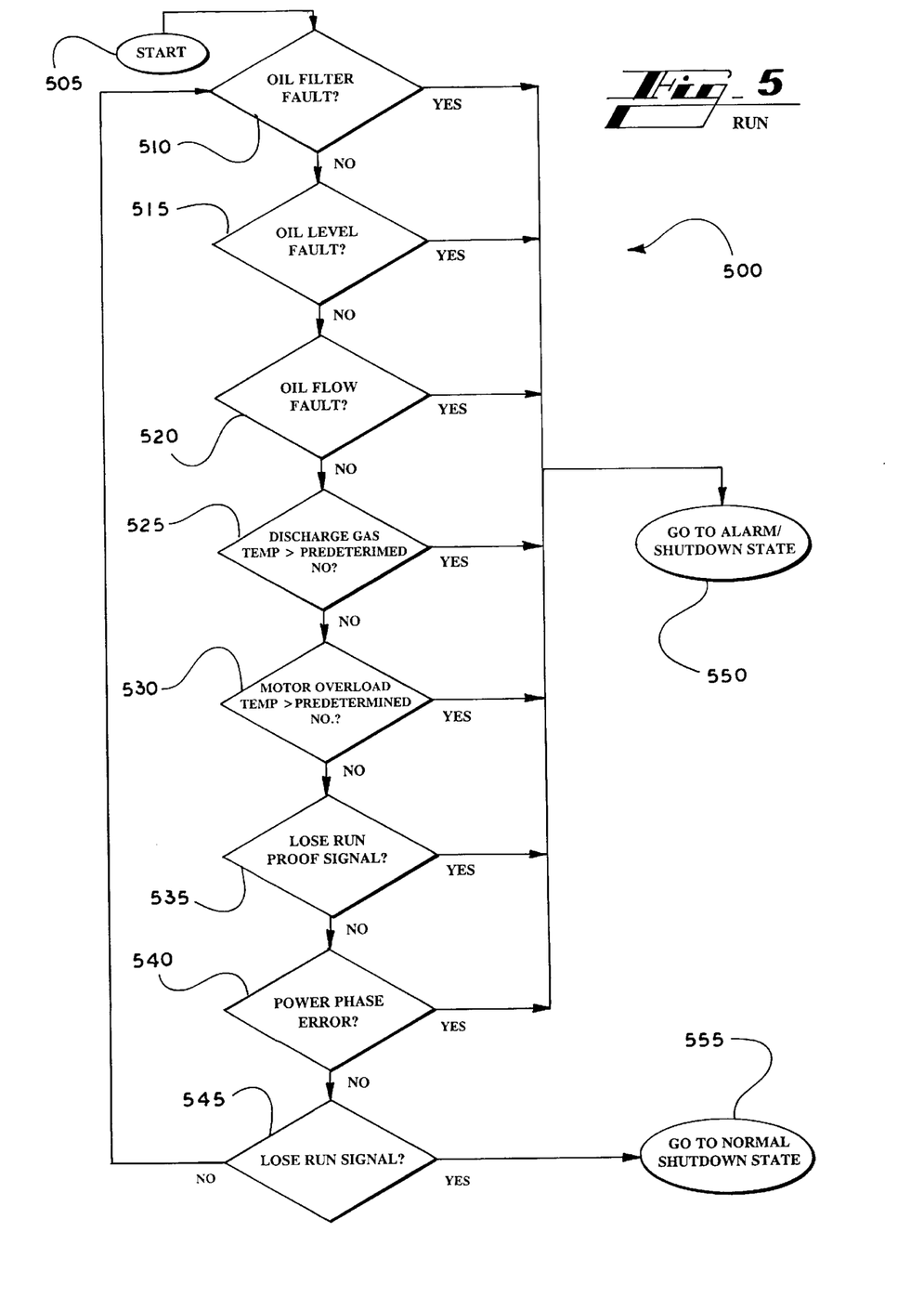
FIG. 5 is a flow diagram illustrating an exemplary method for operating a compressor and which forms a part of the method of FIG. 3.
Figure 6:
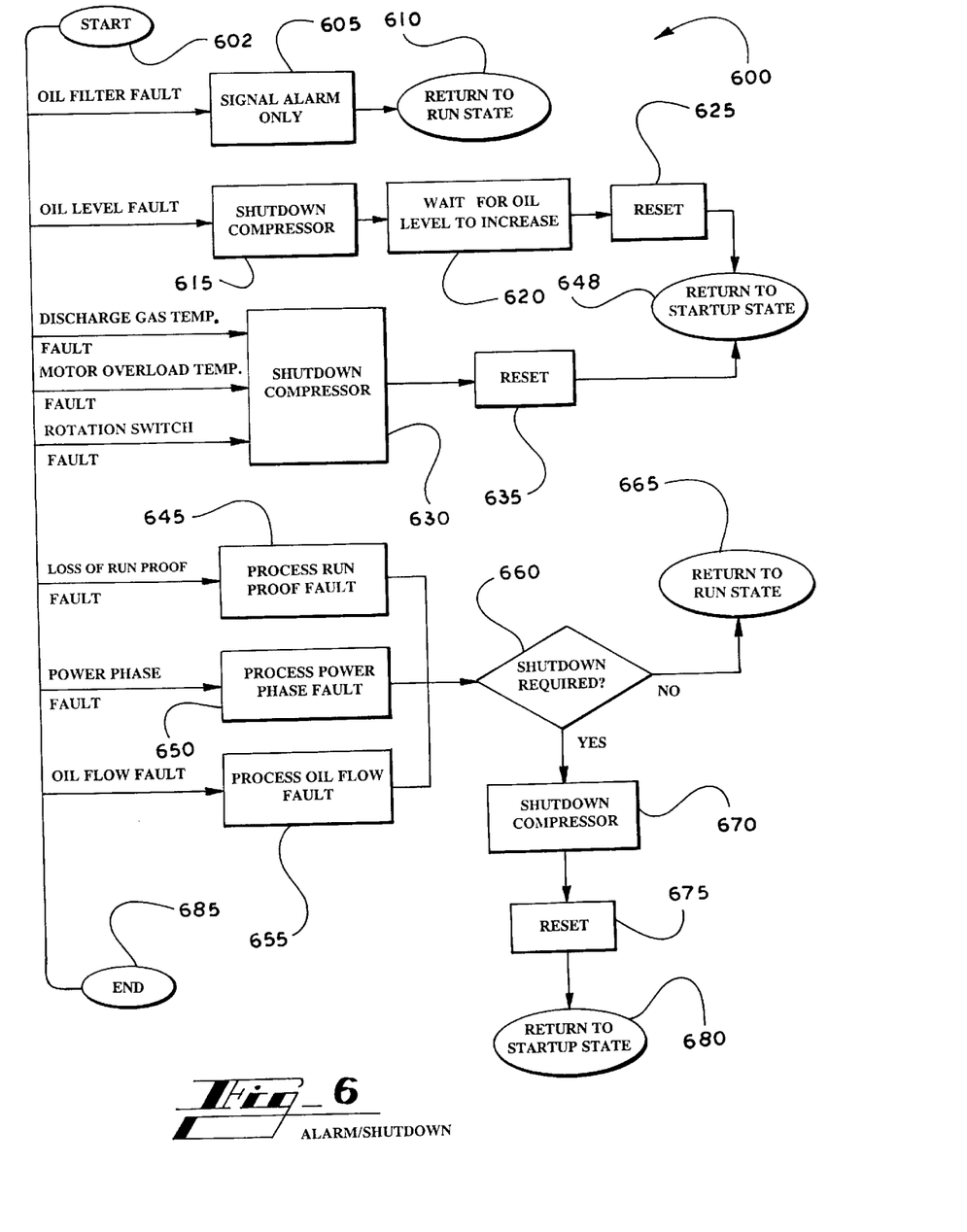
FIG. 6 is a flow diagram illustrating an exemplary method for shutting down a compressor and providing an alarm and which forms a part of the method of FIG. 3.

FIGS. 4–6 are flow diagrams that illustrate exemplary methods for implementing the methods of the startup state 304, run state 306, and alarm/shutdown state 308 of FIG. 3.

FIG. 4 is a flow diagram illustrating an exemplary method 400 for starting up the screw compressor 115 within a refrigeration system 200. The startup method begins at the START step 402 in response to one of three events. First, the compressor controller will enter the startup state 304 from the idle state 302 in response to receiving a run signal from the rack controller. The compressor controller will enter the startup state 304 from the alarm/shutdown state 308 in response to receiving a manual reset event or an automatic reset event. Those skilled in the art will appreciate that if the compressor controller enters the startup state 304 from the alarm/shutdown state 308, the compressor controller will check to make sure that the run signal from the rack controller is still present. If not, the compressor controller will enter the shutdown state 312.

In the startup state, the compressor controller performs static checks prior to energizing the compressor and dynamic checks immediately after the compressor is energized. At step 405 the compressor controller 105 checks for a discharge gas temperature fault, which is indicated by a discharge gas thermistor 216. A discharge gas temperature fault occurs when the discharge gas temperature of the screw compressor 115 exceeds a predetermined acceptable limit. If the compressor controller 105 detects a discharge gas temperature fault, it proceeds to step 440 and enters the alarm/shutdown state 308 (FIG. 3).

If a discharge gas temperature fault is not detected, then the method 400 proceeds to step 410, where the compressor controller 105 checks for a motor overload temperature fault, which is indicated by the motor overload thermistor 228. A motor overload temperature fault occurs when the temperature of the windings in the screw compressor 115 exceeds a predefined acceptable limit. If a motor overload temperature fault occurs, the method 400 proceeds to the step 440 and enters the alarm/shutdown state 308 (FIG. 3). If no motor overload temperature fault occurs, the compressor has passed the static tests and the compressor controller proceeds to step 415.

At step 415, the compressor controller 105 starts the screw compressor 115. This is accomplished by energizing the contactor 210, which causes the contacts to be closed on three phase power to be applied to the compressor 115.

Once power is applied to the compressor, the compressor controller performs a series of dynamic checks to ensure that the screw compressor has started up properly. At step 420, the compressor controller 105 checks for a power phase fault, which occurs when a power loss occurs over one of the power phases 232*a–c* or when the rotation is not in the proper direction. The proper direction is determined by measuring the power phases 232*a–c* and performing a calculation on those measurements. If a power phase fault occurs, then method 400 proceeds to step 440 and enters the alarm/shutdown state 308 (FIG. 3). If no power phase fault is detected, the compressor controller proceeds to step 425.

At step 425 the compressor controller checks the compressor rotation by way of the rotation switch 214. This step is performed within two seconds of power being applied at step 415. If the compressor controller receives a signal indicating that the rotation is in the reverse direction, the compressor controller proceeds to step 440 and enters the alarm/shutdown state 308 (FIG. 3). If the rotation is in the proper direction, the compressor controller proceeds to step 427 and continues with its dynamic checks.

At step 427, the compressor controller 105 checks to determine if there is a valid run proof by checking the run proof signal provided by the contactor 210. If the compressor controller does not detect a run proof signal, a run proof fault occurs and the compressor controller proceeds to step 440 and enters the alarm/shutdown state 308 (FIG. 3). If a run proof signal is detected, the compressor has passed the dynamic startup test and the method 400 continues to step 430.

At step 430, the compressor controller 105 energizes the oil solenoid 218, which allows oil to flow to the compressor. The compressor controller 105 waits at least two seconds after the screw compressor 105 has been started prior to energizing the oil solenoid 218. After energizing the oil solenoid 218, the compressor controller 105 waits until at least five seconds have elapsed since the screw compressor 105 has been started and proceeds to step 435.

At step 435, the compressor controller 105 energizes a first loader 212 and a second loader (not shown in FIG. 2). After having energized the loaders, the screw compressor 105 startup has been completed and the method 400 terminates at step 445 and the compressor controller enters the run state 306 (FIG. 3).

FIG. 5 is a flow diagram illustrating an exemplary method 500 for operating the screw compressor 105 within the refrigeration system 200. The method 500 begins at the START step 505 in response to the compressor controller 105 entering the run state 306 (FIG. 3), which occurs after exiting the startup state 304 or returning from the alarm/shutdown state 308.

At step 510 the compressor controller 105 checks the oil filter input, which is connected to the oil filter differential switch 222, to determine if the oil filter is dirty. If an oil filter fault is detected, signifying that the oil filter is dirty, the compressor controller 105 goes to step 550 and enters the alarm/shutdown state 308 (FIG. 3). If no oil filter fault is detected, the compressor controller continues to step 515.

At step 515, the compressor controller 105 checks for an oil level fault, which is provided by the oil level sensor 224. If an oil level fault is detected, signifying that the oil level is too low in the oil separator 234, the compressor controller goes to step 550 and enters the alarm/shutdown state 308 (FIG. 3). If an oil level fault is not detected, the method 500 proceeds to step 520.

At step 520, the compressor controller 105 checks for an oil flow fault, which is provided by the oil flow switch 220. If an oil flow fault is detected, signifying that the minimum required oil flow is not entering the screw compressor 115, the compressor controller 105 goes to step 550 and enters the alarm/shutdown state 308 (FIG. 3). If an oil flow fault is not detected, then the minimum required oil flow is present and the compressor controller proceeds to step 525.

At step 525, the compressor controller 105 checks for a discharge gas temperature fault, which is provided by the discharge gas thermistor 216, and occurs when the discharge gas temperature exceeds a predetermined range. If a discharge gas temperature fault occurs, the compressor controller 105 goes to step 550 and enters the alarm/shutdown state 308 (FIG. 3). If the compressor controller 105 determines that no discharge gas temperature fault has occurred, the compressor controller continues to step 530.

At step 530, the compressor controller 105 checks for a motor overload temperature fault, which is provided by the motor overload thermistor 228, and occurs when the winding temperature exceeds a predetermined limit. If a motor overload fault is detected, the compressor controller 105 goes to step 550 and enters the alarm/shutdown state 308 (FIG. 3). If the compressor controller 105 does not detect a motor overload temperature fault, the compressor controller continues to step 535.

At step 535, the compressor controller 105 checks to determine if the run proof signal has been lost. If the compressor controller 105 determines that the run proof signal is not present, signifying that the contacts in the contactor 210 are open and no power is being sent to the screw compressor 115, the compressor controller 105 goes to step 550 and enters the alarm/shutdown state 308 (FIG. 3).

If the compressor controller 105 determines that the run proof signal is present, then the method 500 continues to step 540.

At step 540, the compressor controller 105 checks for a power phase fault by monitoring the three phase power input 230. If compressor controller 105 determines that a power phase fault has occurred, the compressor controller 105 goes to step 550 and enters the alarm/shutdown state 308 (FIG. 3). If the compressor controller does not detect a power phase fault, the compressor controller proceeds to step 545.

At step 545, the compressor controller 105 checks whether there is a run signal from the rack controller 110 (FIG. 1). If the run signal is not present, the compressor controller 105 goes to step 555 and enters the normal shutdown state 312 (FIG. 3). If the run signal continues to be present, the compressor controller returns to step 510 and continues to monitor the operating parameters associated with the refrigeration system.

FIG. 6 is a flow diagram illustrating an exemplary method 600 for shutting down the screw compressor 105 in response to fault condition within the refrigeration system 200. The method 600 begins at the START step 602 in response to the compressor controller 105 entering the alarm/shutdown state 308 (FIG. 3), which occurs when a fault is detected during the startup state 304 or the run state 306. The specific response taken by the compressor controller 105 depends on the nature of the detected fault and, in some cases, on one or more user selectable preferences.

In the case where an oil filter fault was detected, the compressor controller proceeds to step 605 where the compressor controller 105 sends an alarm signal lighting an oil filter alarm lamp 226h. Because an oil filter fault is not considered critical, the compressor may continue to run and the compressor controller proceeds to step 610 where it reenters the run state 306 (FIG. 3).

In the case where an oil level fault is detected, the compressor controller proceeds to step 615, where the compressor controller shuts down the screw compressor 115 by sending a signal that causes the contactor 210 to cut power to the screw compressor 115. An alarm signal will also be sent to the rack controller via the network interface 240. The oil level alarm lamp 226e will also be illuminated. The compressor controller proceeds to step 620, waits for the oil level fault to be corrected. Once the oil level fault is corrected, the compressor controller monitors the oil level input for three minutes to determine if another oil level fault is generated. If after three minutes, no oil level fault is generated, the compressor controller performs an automatic reset. If within the three minutes, however, another oil level fault is detected, the compressor controller continues to monitor until the oil level fault has been corrected for at least three minutes. Once a reset signal is received at step 625, the compressor controller is reset and proceeds to step 640 and returns to the startup state 304 (FIG. 3).

In the case where the compressor controller entered the alarm/shutdown state 308 because of a discharge gas temperature fault, a motor overload temperature fault, or a rotation switch fault, the compressor controller proceeds to step 630 and shuts down the screw compressor. An appropriate alarm signal will be sent to the rack controller via the network interface 240. Depending on which type of fault occurred, the compressor controller will also illuminate the discharge gas alarm lamp 226c, the rotation alarm lamp 226b, or the motor overload alarm lamp 226g. The compressor controller 105 then logs the fault into its memory and proceeds to step 635.

At step 635, the compressor controller is reset. In the case where the compressor controller 105 is configured in the automatic reset mode, if the discharge gas temperature fault or a motor overload temperature fault clears itself (i.e., the temperature falls within the safe operating range), the compressor controller 105 will automatically reset and proceed to step 640. If the compressor controller 105 is configured in the manual mode, or if the rotation switch fault occurs, then the compressor controller 105 must be manually reset.

After the manual or automatic reset occurs in step 635, the method 600 proceeds to step 640 where the compressor controller 105 returns to the startup state 304 (FIG. 3).

In the case where the compressor controller entered the alarm/shutdown state 308 as a result of a run proof fault, the compressor controller proceeds to step 645 where it processes the run proof fault. If this fault occurred during the startup state, the compressor controller 105 will wait 15 seconds for the fault to be corrected. If after 15 seconds the run proof fault is still present, then the compressor controller 105 sends a signal to light the run proof alarm lamp 226a. An alarm signal will also be sent to the rack controller. If after another 15 seconds the run proof fault is still detected, a shutdown flag is set. If after another 15 seconds the run proof fault is not detected, the shutdown flag is not set. The method 600 then proceeds to step 660 and checks the shutdown flag.

If the run proof fault occurred while in the run state 306, the compressor controller 105 immediately sends a signal to the rack controller and illuminates the run proof alarm lamp 226a. The compressor controller 105 then turns off the oil solenoid loader outputs. If five seconds have elapsed and the run proof fault is still detected, the shutdown flag is set. If no run proof fault is detected within five seconds of the first occurrence of the run proof fault, the shutdown flag is not set. The method 600 then proceeds to step 660.

In the case of a power phase fault, the compressor controller proceeds to step 650. The compressor controller sets the shutdown flag. An alarm signal will also be sent to the compressor controller and the phase alarm lamp 226c will be illuminated. The alarm occurrence will also be logged in the compressor controller's memory. The compressor controller then proceeds to step 660.

In the case where an oil flow fault was detected, the compressor controller proceeds to step 655 where it process the oil flow fault. If there was a previous valid oil flow signal, the compressor controller 105 will wait five seconds and check for a valid oil flow signal. If the oil flow fault is not present after the five second delay, the shutdown flag is not set and the method 600 proceeds to step 660. However, if the oil flow fault is still present after five seconds, the compressor controller 105 will, if configured for manual reset, wait to see if there is a valid oil flow signal 15 seconds after the oil flow fault was detected. When configured for automatic reset, the compressor controller will wait 20 seconds after the oil flow fault was detected. If within 15 seconds, or 20 seconds in automatic reset mode, a valid oil flow signal is received, the shutdown flag is not set. If the oil flow fault is still detected after the 15 seconds, or 20 seconds in automatic reset mode, the shutdown flag is set. The compressor controller then proceeds to step 660.

At step 660, the compressor controller checks the shutdown flag to see if it is set. If not, a shutdown is not required, and the compressor controller proceeds to step 665 and returns to the run state 306 (FIG. 3). If the shutdown flag is set and a shutdown is required, the compressor controller proceeds to step 670, where the compressor is shutdown.

However, the specific actions taken at step 670 depend on the type of fault that was detected.

At step 670, if a run proof fault has occurred, the compressor controller 105 sends a signal to shut down the compressor. The compressor controller then waits for a manual reset. After the reset is received at step 675, the compressor controller goes to step 680 and returns to the startup state 304.

At step 670, if a power phase fault was detected, the compressor controller sends a signal to shut down the screw compressor 115. The shutdown occurrence is logged in the compressor controller's memory. If there have been more than five restarts because of a power phase fault, then the compressor controller will require a manual reset. If there have been four or five restarts, the compressor controller 105 will reset automatically, with a five minute delay. If there have been less than four restarts due to a power phase fault, the compressor controller 105 will reset automatically with a 30 second delay. The compressor controller then proceeds to step 675, where it is reset. The compressor controller then goes to step 680 and returns to the startup state 304.

At step 670, if an oil flow fault was detected, an alarm signal will also be sent to the rack controller and the oil flow alarm lamp 226f will be illuminated. If the compressor is configured for an automatic reset for an oil flow fault and if there have been less than four oil flow faults in a 10 minute period, the compressor will automatically reset after a 30 second delay. If the compressor is configured for manual reset for an oil flow fault or if there have been more than three failures in a ten minute period, the compressor controller 105 will require a manual reset. The compressor controller then proceeds to step 675 to be reset. The compressor controller then goes to step 680 and returns to the startup state 304.

REVIEW OF THE DETAILED DESCRIPTION

From the foregoing description, it will be appreciated that the present invention provides an improved system and method for monitoring the operation of a compressor and for providing alarms and controlling the compressor in response to various operating parameters. In the described embodiment, the invention provides an integrated compressor controller that monitors relevant conditions, provides alarm signals, and controls the compressor in response to the monitored conditions. The compressor controller provides maximum protection for the compressor by monitoring a plurality of relevant conditions and by shutting the compressor down when necessary. The compressor also maximizes the compressor's availability by evaluating the monitored conditions to determine whether the compressor can continue to run or be restarted despite a fault condition.

The invention may conveniently be implemented in a compressor controller that includes one or more program modules that are based upon and implement the features illustrated in FIGS. 3–6. No particular programming language has been described for carrying out the various procedures described above because it is considered that the operations, steps, and procedures described above and illustrated in the accompanying drawings are sufficiently disclosed to permit one of ordinary skill in the art to practice the present invention. In addition, although the invention was described in the context of a compressor controller that controls a particular type of screw compressor and monitors a specific group of operating parameters, those skilled in the art will appreciate that the invention is applicable to a variety of compressors and refrigeration systems, and may be used to monitor any operating parameters that are relevant to the operation of the compressor.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a refrigeration system including a compressor and a rack controller, a method for controlling the compressor, comprising the steps of:

receiving a run signal;

in response to the run signal, determining whether a first set of parameters indicate the compressor may be started;

in response to a determination that the compressor may be started, starting the compressor;

determining whether a second set of parameters indicate the compressor has started properly;

in response to a determination that the compressor has not started properly, shutting down the compressor;

in response to a determination that the compressor has started properly, determining whether a third set of parameters indicate the compressor is operating properly; and in response to a determination that the compressor is not operating properly, executing an alarm or shutdown routine.

2. The method of claim 1, further comprising the steps of:

losing the run signal;

in response to the loss of the run signal, shutting down the compressor;

determining whether the compressor has continued to operate; and in response to the compressor continuing to operate, providing an alarm.

3. The method of claim 2, further comprising the step of maintaining oil flow to the compressor in response to the compressor continuing to operate.

4. The method of claim 1, wherein the alarm or shutdown routine includes the steps of:

determining whether a fault condition requires an alarm;

in response to the fault condition requiring an alarm, providing an alarm;

determining whether the fault condition requires the compressor to be shutdown;

in response to the fault condition requiring the compressor to be shut down, shutting down the compressor;

determining whether the compressor may be restarted; and restarting the compressor in response to a determination that the compressor may be restarted.

5. The method of claim 4, wherein determining whether the compressor may be restarted comprises the steps of:

determining whether the fault condition allows the compressor to be restarted; and determining whether user-selectable options allow the compressor to be restarted.

6. The method of claim 1, wherein the first set of parameters includes at least one temperature associated with the compressor, and wherein determining whether the compressor may be started includes determining whether the at least one temperature is within an acceptable range.

7. The method of claim 1, wherein starting the compressor comprises closing a contactor that provides power to the compressor.

8. The method of claim 1, wherein the second set of parameters includes compressor rotation, and determining whether the compressor has started properly includes determining whether the compressor is rotating in the proper direction.

9. The method of claim 1, wherein the second set of parameters includes the phase sequence associated with the power applied to the compressor, and determining whether the compressor has started properly includes determining whether the phase sequence is proper.

10. The method of claim 1, further comprising the steps of providing oil flow and energizing loaders in response to the compressor starting properly.

11. The method of claim 1, wherein the third set of parameters includes conditions selected from a group including a differential pressure associated with an oil filter, an oil level, and an oil flow verification.

12. The method of claim 1, wherein the third set of parameters includes a temperature selected from a group including discharge gas temperature and motor overload temperature, and determining whether the compressor is operating properly includes determining whether the temperature is within an acceptable operating range.

13. The method of claim 1, wherein the third set of parameters includes a condition selected from a group including a run proof signal and a power phase signal.

14. A compressor controller, comprising:
   an input for receiving a run signal from a rack controller;
   a plurality of inputs for receiving input signals indicative of operating parameters associated with a compressor;
   an output for applying power to the compressor; and
   a microprocessor operative to:
      detect the run signal from the rack controller;
      determine, in response to the run signal, whether a first set of operating parameters indicate the compressor may be started;
      in response to a determination that the compressor may be started, start the compressor;
      determine whether a second set of operating parameters indicate the compressor has started properly;
      in response to a determination that the compressor has not started properly, shut down the compressor;
      in response to a determination that the compressor has started properly, determine whether a third set of parameters indicate the presence of a fault condition;
      determine whether the fault condition requires an alarm;
      in response to the fault condition requiring an alarm, provide an alarm;
      determine whether the fault condition requires the compressor to be shutdown;
      in response to the fault condition requiring the compressor to be shut down, shut down the compressor;
      determine whether the compressor may be restarted; and
      restart the compressor in response to a determination that the compressor may be restarted.

15. The compressor controller of claim 14, wherein the microprocessor is further operative to:
   detect the loss of the run signal from the rack controller;
   in response to the loss of the run signal, shut down the compressor;
   determine whether the compressor has continued to operate; and
   in response to the compressor continuing to operate, provide an alarm.

16. The compressor controller of claim 15, wherein the microprocessor is further operative to maintain oil flow to the compressor in response to the compressor continuing to operate.

17. The compressor controller of claim 14, wherein determining whether the compressor may be restarted comprises:
   determining whether the fault condition allows the compressor to be restarted; and
   determining whether user-selectable options allow the compressor to be restarted.

18. The compressor controller of claim 14, wherein the first set of parameters includes at least one temperature associated with the compressor, and wherein determining whether the compressor may be started includes determining whether the at least one temperature is within an acceptable range.

19. The compressor controller of claim 14, wherein starting the compressor comprises closing a contactor that provides power to the compressor.

20. The compressor controller of claim 14, wherein the second set of parameters includes compressor rotation, and determining whether the compressor has started properly includes determining whether the compressor is rotating in the proper direction.

21. The compressor controller of claim 14, wherein the second set of parameters includes the phase sequence associated with the power applied to the compressor, and determining whether the compressor has started properly includes determining whether the phase sequence is proper.

22. The compressor controller of claim 14, wherein the microprocessor is further operative to provide oil flow and energize loaders in response to the compressor starting properly.

23. The compressor controller of claim 14, wherein the third set of parameters includes conditions selected from a group including a differential pressure associated with an oil filter, an oil level, and an oil flow verification.

24. The compressor controller of claim 14, wherein the third set of parameters includes a temperature selected from a group including discharge gas temperature and motor overload temperature, and wherein determining whether the compressor is operating properly includes determining whether the temperature is within an acceptable operating range.

25. The compressor controller of claim 14, wherein the third set of parameters includes a condition selected from a group including a run proof signal and a power phase signal.

* * * * *